(12) United States Patent
Kwak et al.

(10) Patent No.: US 6,803,983 B2
(45) Date of Patent: Oct. 12, 2004

(54) LIQUID CRYSTAL DISPLAY DEVICE AND A FABRICATING METHOD

(75) Inventors: Dong Yeung Kwak, Daegu-shi (KR); Kwang Seop Park, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 300 days.

(21) Appl. No.: 09/736,334

(22) Filed: Dec. 15, 2000

(65) Prior Publication Data

US 2001/0013918 A1 Aug. 16, 2001

(30) Foreign Application Priority Data

Dec. 17, 1999 (KR) .......................................... P99-58746

(51) Int. Cl.$^7$ ............................................ G02F 1/1339
(52) U.S. Cl. ...................................... 349/153; 349/190
(58) Field of Search ................................ 349/153, 190

(56) References Cited

U.S. PATENT DOCUMENTS

| | | | | |
|---|---|---|---|---|
| 5,995,189 A | * | 11/1999 | Zhang | .......................... 349/153 |
| 6,011,608 A | * | 1/2000 | Tanaka | .......................... 349/153 |
| 6,239,854 B1 | * | 5/2001 | Hirakata et al. | ............. 349/149 |
| 6,424,401 B1 | * | 7/2002 | Kang et al. | .................. 349/153 |

* cited by examiner

Primary Examiner—James A. Dudek
(74) Attorney, Agent, or Firm—McKenna Long & Aldridge LLP

(57) ABSTRACT

A liquid crystal display device, and a fabricating method thereof, with improved bonding of an upper plate to a lower plate. The lower plate includes an organic protective film over an inorganic gate insulating layer that is on a substrate. Channels through the organic protective film expose either metal patterns or the gate insulating layer. A seal coated with a sealant is then placed over the organic protective film and channels. The sealant passes through the channels to the metal patterns or to the gate insulating layer. Bonding of the seal to the lower plate is improved by the sealant that contacts the metal patterns and/or the gate insulating layer. During LCD fabrication, the metal patterns act as etch stops when etching the channels. Alternatively, an etch stop semiconductor layer is placed on the gate insulating film. The etch stops prevent the etching process from exposing the lower substrate.

19 Claims, 17 Drawing Sheets

LIQUID CRYSTAL DISPLAY DEVICE AND A FABRICATING METHOD

This application claims the benefit of Korean Patent Application No. 1999-58746, filed on Dec. 17, 1999, which is hereby incorporated by reference for all purposes as if fully set forth herein.

BACKGROUND OF THE INVENTION

1. Field of the Invention

The present invention relates to liquid crystal displays. More particularly it relates to liquid crystal displays, and its fabricating method, having improved bonding of an upper plate to a lower plate.

2. Discussion of the Related Art

Generally, a liquid crystal display (LCD) controls the light transmissivity of liquid crystal cells arranged in a matrix pattern in response to video signals so as to display a picture that corresponds to the video signals. To this end, the LCD includes a liquid crystal display panel having active matrix liquid crystal cells and driving integrated circuits (IC's) for driving the liquid crystal cells.

The driving IC's are usually manufactured in chip form. They are then mounted on a tape carrier package (TCP) film that is attached to the outer periphery of the liquid crystal panel. The driving chips are then connected to the liquid crystal display by a tape automated bonding (TAB) system of a chips on glass (COG) system. The driving IC's electrically connect to pads along edges of the liquid crystal panel. The pads electrically connect to electrode lines that connect to the liquid crystal cells. Thus, driving signals from the driving IC's are applied to the liquid crystal cells.

FIG. 1 is a plan view showing a conventional liquid crystal display panel. As shown, the liquid crystal panel 2 has a lower plate 4 and an upper plate 6. Those plates are bonded together in parallel. The liquid crystal panel 2 includes a picture display part 8 having liquid crystal cells that are arranged in a matrix pattern, and gate pads 12 and data pads 14 that connect to the driving IC's (which are not shown). Gate links 34 and data links 16, respectively, connect the gate pads 12 and the data pads 14 to the picture display part 8. A seal 10 is provided at the outer circumference of the picture display part 8. The seal assists the bonding of the lower plate 4 to the upper plate 6.

In the picture display part 8, a plurality of data lines 13 receive video signals applied via the data pads 14 and the data links 16. The data lines are arranged in such a manner as to intersect with a plurality of gate lines 11. The gate lines 11 receive scanning signals that are input via the gate pads 12 and the gate links 34. At the intersections are thin film transistors (TFTs) that switch data signals to pixel electrodes so as to drive the liquid crystal cells. The upper plate 6 has red, green and blue color filters formed separately using a black matrix, and a common transparent electrode that is formed on the color filters. The lower plate 4 and the upper plate 6 are separated by a uniform distance using a spacer to provide a cell gap.

The lower plate 4 and the upper plate 6 are bonded together using a sealant that is coated on the seal 10. The gap between the upper plate 6 and the lower plate 4 is injected-filled with a liquid crystal material and then sealed. The gate pads 12 and the data pads 14 are located along edges of the lower plate 4 that are not overlapped by the upper plate 6. Each gate pad 12 applies a scanning signal, via a wire within the TCP film, from a gate driving IC, via a gate link 34, to a gate line 11 of the picture display part 8. Each of the data pads 14 applies video data signals from a data driving IC, via a data link 16, to a data line 13 of the picture display part 8.

In the liquid crystal panel 2, a protective film that protects the metal electrode lines and the thin film transistors is coated over the lower plate 4. The pixel electrodes connect, via contact holes, to the thin film transistors. Each pixel electrode is a transparent electrode, beneficially made from indium tin oxide (ITO), which has a relatively strong affinity to the liquid crystal material. Generally, the protective film is an inorganic material, such as $SiN_x$ or $SiO_x$. Since inorganic films usually have high dielectric constants, conventional liquid crystal panels with inorganic protective films have a problem in that coupling between pixel electrodes and data lines 13 caused by a parasitic capacitor is high. To minimize that coupling it is often necessary to widely space the electrodes, for example, by 3 to 5 μm, such that the pixel electrodes do not overlap the data line 13. Accordingly, in conventional liquid crystal display panels it is necessary to form narrow pixel electrodes. Thus, an aperture ratio of the liquid crystal cell that depends on the area of the pixel electrode is inevitably lowered. To address this problem, an organic material, such as benzocyclobutene (BCB), spin on glass (SOG) or Acryl, etc., having a relatively low dielectric constant (about 2.7) has been used as the protective film. Such organic protective films can enable an enlarged aperture ratio.

In a high aperture ratio LCD having an organic protective film, the sealant on the seal contacts the organic protective film during the bonding of the upper plate 6 to the lower plate 4. However, many sealants, such as epoxy resins, have strong adhesion with glass but weak adhesion with respect to organic protective films. For this reason, a high aperture ratio LCD employing an organic protective film has a problem in that an impact can cause a crack between the sealant and the organic protective film that the liquid crystal material can leaked through. Additionally, an organic protective film generally has poor adhesion with the gate insulating film. Such problems are described in more detail with reference to the accompanying drawings.

FIG. 2 is an enlarged plan view of data links 16 crossing the seal 10 in FIG. 1. FIG. 2 also shows data pads 14. A semiconductor layer 18 extends from each data line into a data pad 14 that is located at an end of the data link 16. As previously discussed the seal 10 is coated with a sealant. That seal is on an organic protective film 24 (see FIG. 3A) and crosses the data links 16. Each data pad 14 contacts a transparent electrode 17 through a contact hole 19.

FIG. 3A shows a vertical section of the liquid crystal display panel taken along the A—A' line in FIG. 2, while FIG. 3B shows a vertical section of the liquid crystal display panel taken along the B—B' line in FIG. 2. In FIGS. 3A and 3B, the lower plate 4 has an inorganic gate insulating layer 22, semiconductor layers 18, and data links 16 on a lower glass substrate 20, and an organic protective film 24 that entirely coats the lower plate 4. The upper plate 6 has a color filter and black matrix 28 on one side of an upper glass substrate 30 and a common transparent electrode 26. The lower plate 4 and the upper plate 6 are bonded to each other using a sealant coated on the seal 10. The sealant has poor adhesion to the organic protective film 24. Also, the organic protective film 24 has poor adhesion with the gate insulating film 22. Floating of the organic protective film 24, or leakage of a liquid crystal material 32, may result from a crack generated from an exterior impact. FIG. 3B shows a picture display part 8 that holds the liquid crystal material 32.

FIG. 4 is an enlarged plan view of FIG. 1 showing the seal 10 crossing gate links 34. FIG. 4 also shows gate pads 12.

The gate pads 12 contact transparent electrodes 17 through contact holes 19. As previously mentioned the seal 10 coated with a sealant.

FIG. 5A shows a vertical section of the liquid crystal display panel taken along the A—A' line in FIG. 4, while FIG. 5B shows a vertical section of the liquid crystal display panel taken along the B—B' line in FIG. 4. In FIGS. 5A and 5B, the lower plate 4 has gate links 34 and a gate insulating layer 22, disposed on a lower glass substrate 20, and an organic protective film 24 that is coated on the gate links 34 and on the gate insulating layer 22. The upper plate 6 has a color filter and black matrix 28 on an upper glass substrate 30, and a common transparent electrode 26. The lower plate 4 and the upper plate 6 are bonded to each other using the sealant coated on the seal 10. Again, the sealant has poor adhesion to the organic protective film 24.

As a result, a liquid crystal display panel employing an organic protective film has a problem in that, due to poor adhesion between the sealant and the organic protective film, or between the organic protective film and the gate insulating film, a crack is readily generated by an exterior impact. This can cause leakage of the liquid crystal material 32 in the picture display part 8.

SUMMARY OF THE INVENTION

Accordingly, the present invention is directed to a liquid crystal display device, and a fabricating method thereof, that substantially obviates one or more of the problems due to limitations and disadvantages of the related art.

An object of the present invention is to provide a liquid crystal display device, and a fabricating method thereof, wherein adhesion between a sealant and a plate is improved, thereby preventing leakage of liquid crystal material caused by an exterior impact.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, a liquid crystal display device according to the principles of the present invention includes channels, beneficially defined by etching an organic protective film, formed between link electrodes. A patterned etch stop is located below the organic protective film and between the link electrodes. The etch stop acts as an etch stopper when etching the organic protective film. A sealant coated on a seal contact a gate insulating film and/or the etch stop by way of the channels.

A method of fabricating a liquid crystal display device according to another aspect of the present invention includes the steps of forming an etch stop pattern on a gate insulating film at areas between gate link electrodes, etching those areas to form channels that terminate at the etch stop pattern, and locating a sealant coated seal over the channels such that the sealant coats the etch stopper pattern and/or to the gate insulating film through the channels.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the present invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to embodiments of the present invention, example of which are illustrated in the accompanying drawings.

Figure 1:
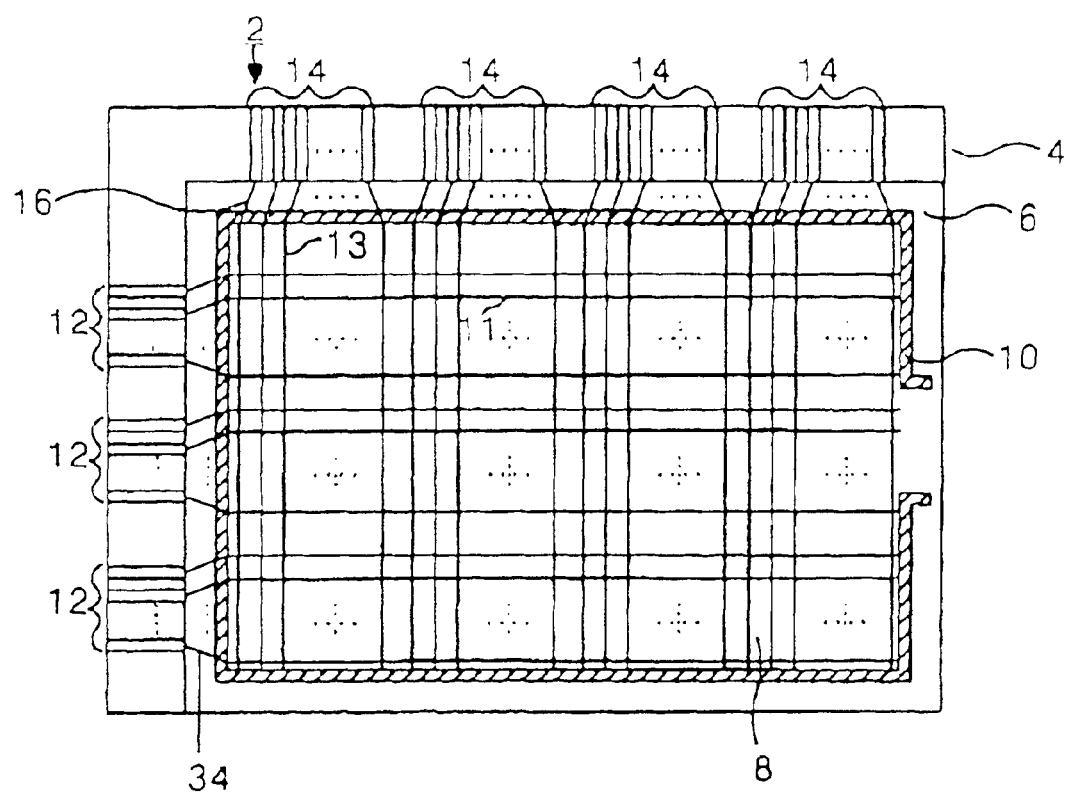
FIG. 1 is a schematic plan view showing a structure of a first conventional liquid crystal display panel.
Figure 2:
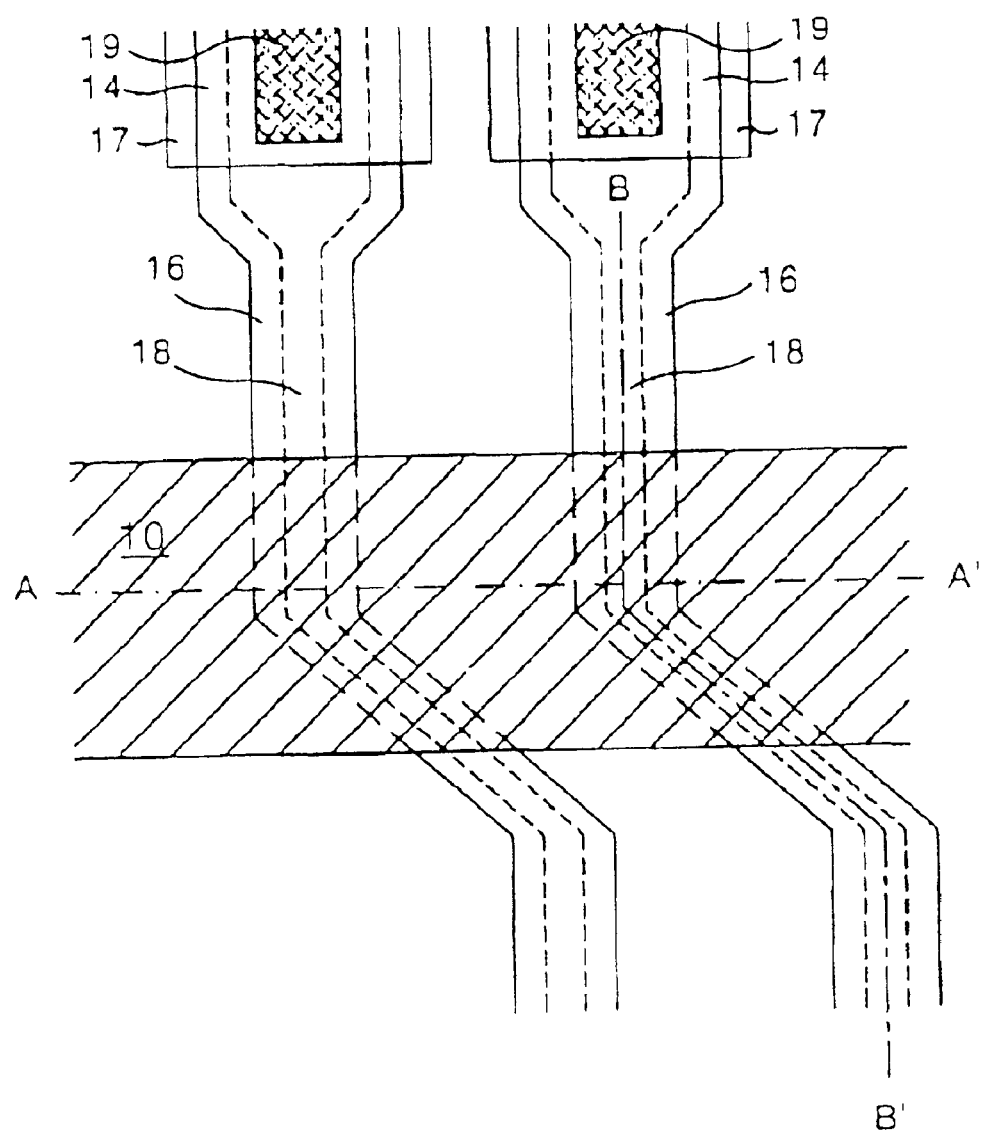
FIG. 2 is an enlarged plan view showing a crossing between data links and the seal in the liquid crystal display panel of FIG. 1.
Figure 3A:
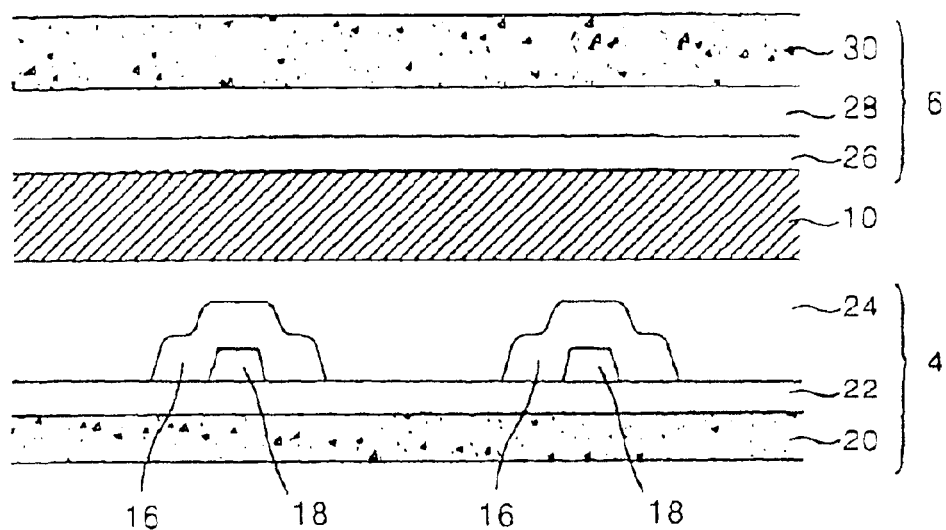
FIG. 3A is a vertical sectional view of the liquid crystal display panel taken along the A—A' line in FIG. 2.
Figure 3B:
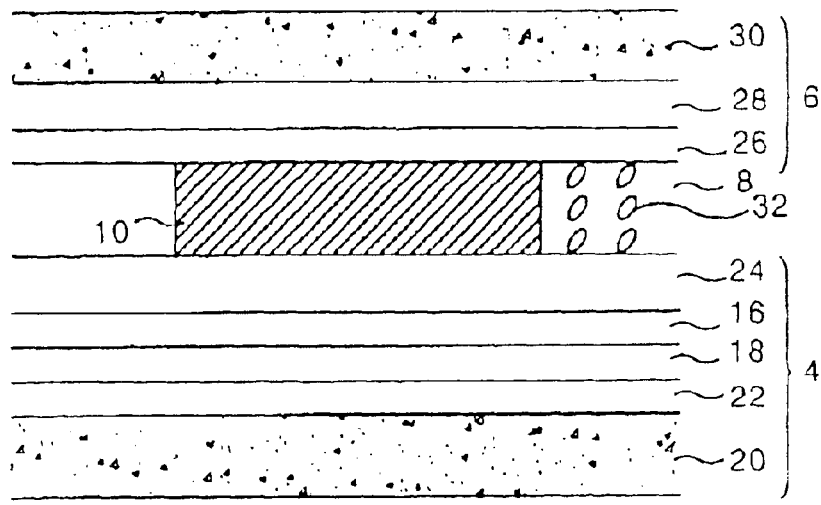
FIG. 3B is a vertical sectional view of the liquid crystal display panel taken along the B—B' line in FIG. 2.
Figure 4:
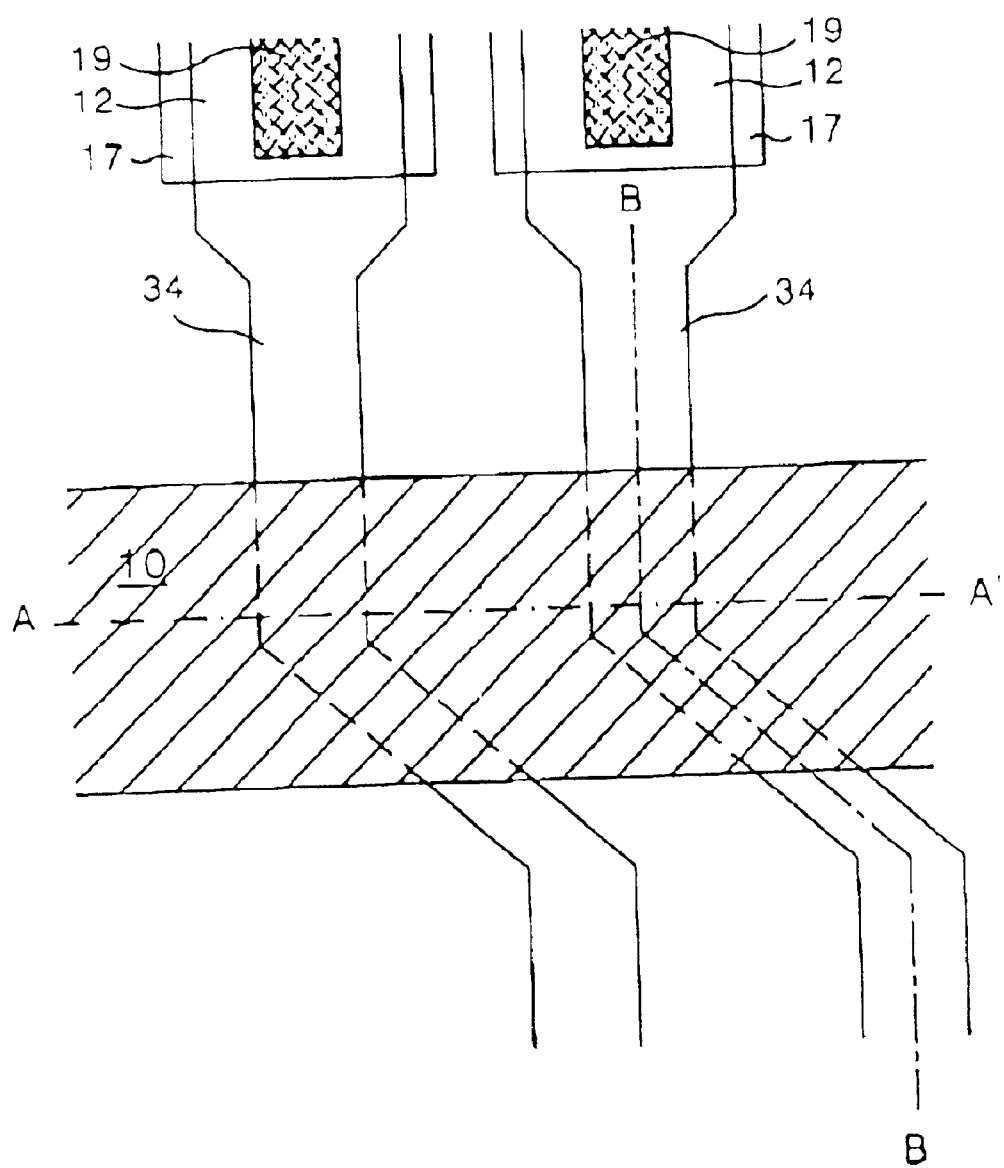
FIG. 4 is an enlarged plan view of a crossing between gate links and the seal in the liquid crystal display panel of FIG. 1.
Figure 5A:
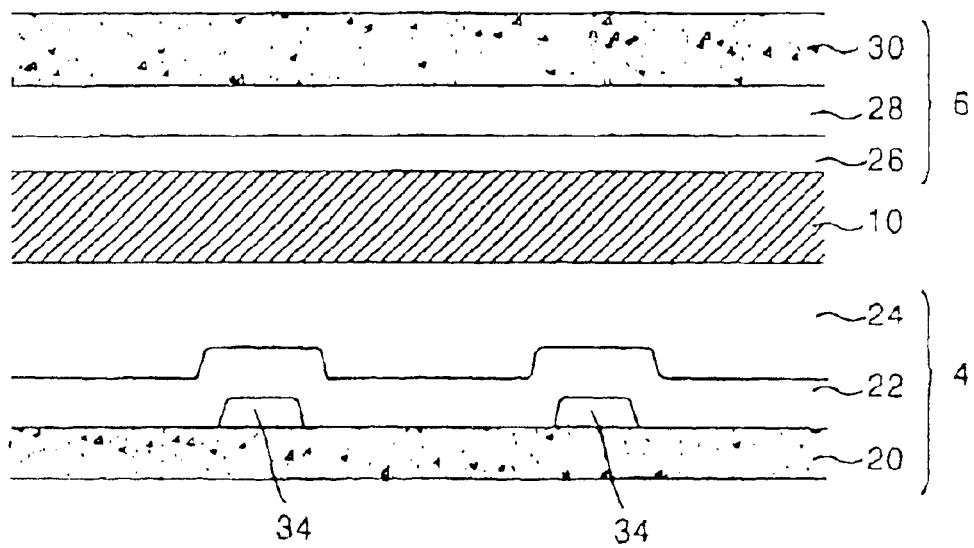
FIG. 5A is a vertical sectional view of the liquid crystal display panel taken along the A—A' line in FIG. 4.
Figure 5B:
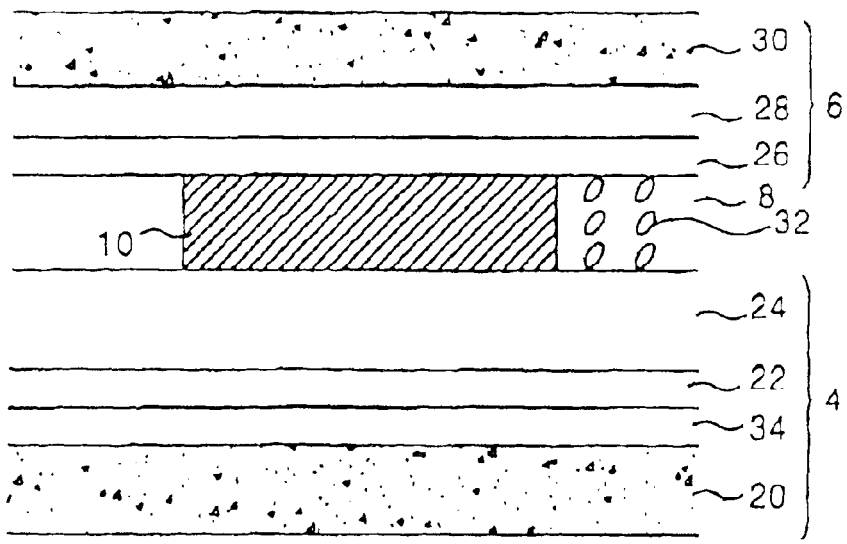
FIG. 5B is a vertical sectional view of the liquid crystal display panel taken along the B—B' line in FIG. 4.
Figure 6:
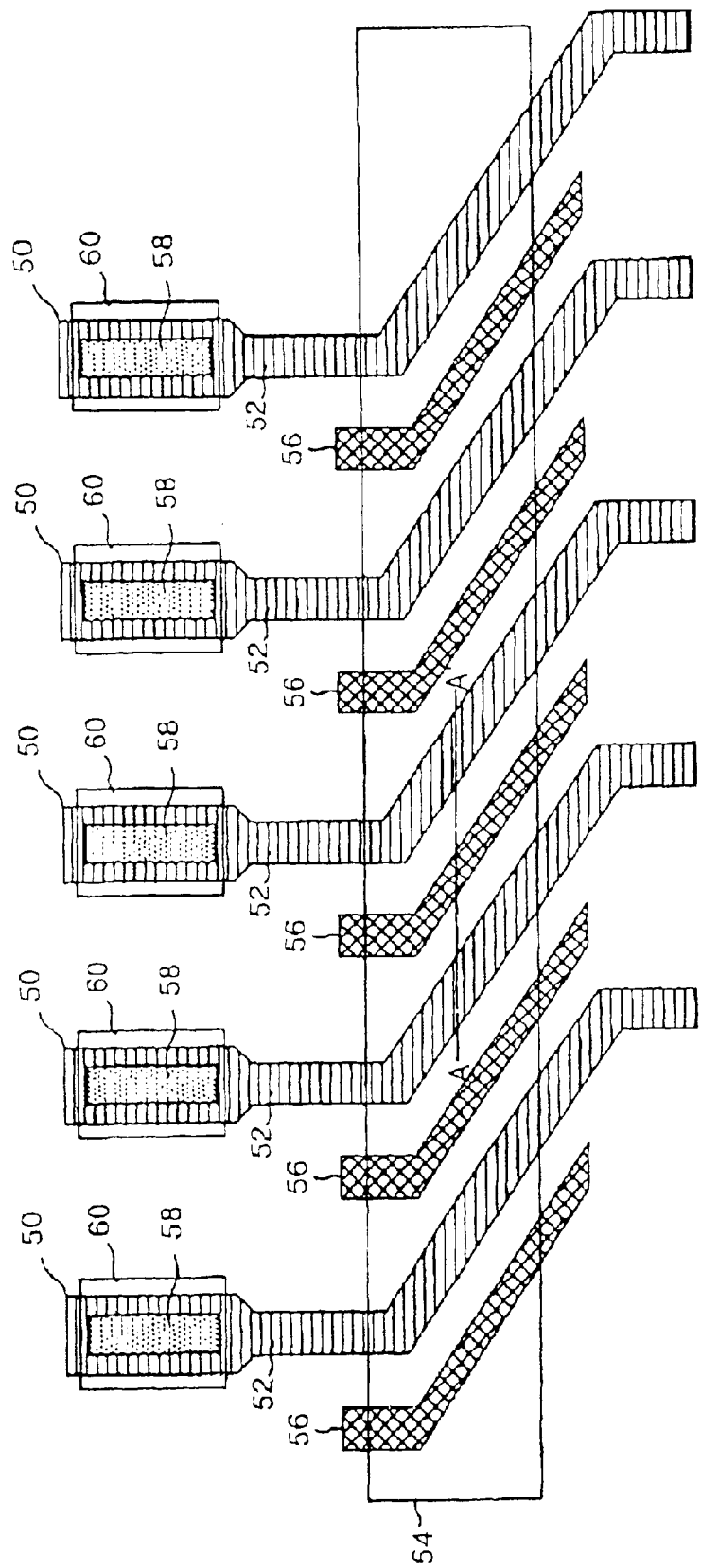
FIG. 6 is a plan view showing a second conventional liquid crystal display panel in which channels are provided between data links where the data links cross the seal.

FIG. 6 shows a plan view of a second conventional liquid crystal display panel wherein data links 52 cross a seal 54. Referring to FIG. 6, in the location where the data links 52 cross the seal 54 there are channels 56 defined between the data links 52. Other elements and features of said liquid crystal display panel are similar to those of the conventional structure illustrated in FIGS. 1–5B.

Figure 7:
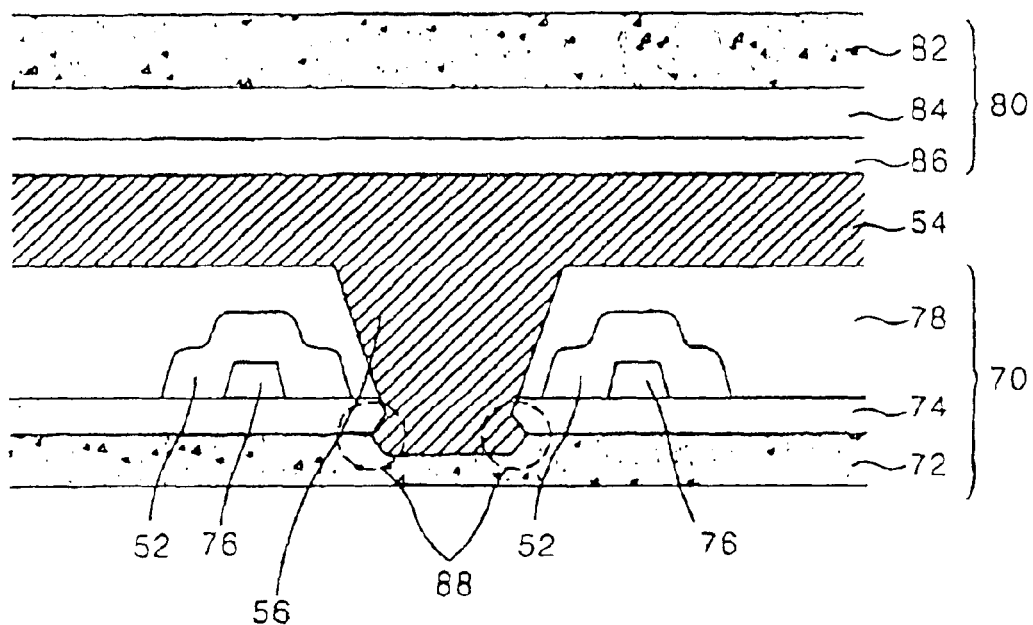
FIG. 7 is a sectional view showing the structure of the second conventional liquid crystal panel taken along the A—A' line in FIG. 6 after etching the organic protective film and the gate insulating film to form the channels in FIG. 6.

FIG. 7 shows a sectional view of the second conventional liquid crystal display panel taken along the A—A' line in FIG. 6. As shown in FIG. 7, the channels 56 defined are formed through an organic protective film 78 and a gate insulating film 74 in such a manner as to expose a lower glass substrate 72 of a lower plate 70. The channels 56 are beneficially formed by dry etching the organic protective film 78 and the gate insulating film 74 under the control of an etching point detective (EPD) window that is provided on an outer area of the panel. In such a structure, the sealant coated on the seal 54 contacts the lower glass substrate 72 during bonding of an upper plate 80 to the lower plate 70. Since many sealants, such as an epoxy, have better adhesion to the lower glass substrate 72 than to the organic protective film 78, the second convention embodiment has better plate bonding than the first conventional embodiment.

Figure 8:
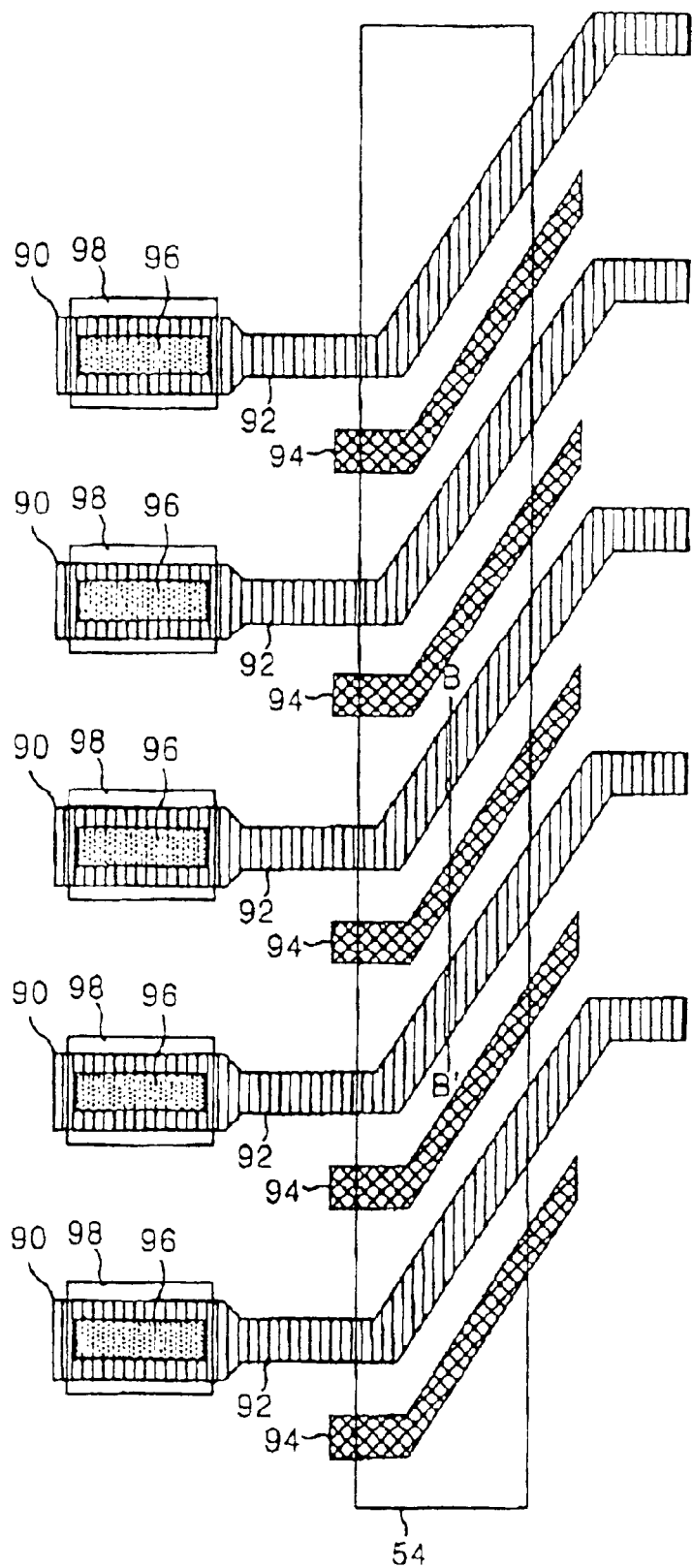
FIG. 8 is a plan view showing a structure of the second conventional liquid crystal display panel in which channels are provided between gate links where the gate links cross the seal.

FIG. 8 shows a plan view of the second conventional liquid crystal display panel where the gate links cross the seal 54. In FIG. 8, near where the gate links 92 cross the seal 54 are channels 94 between the gate links 92. The channels 94 are beneficially formed by etching away the organic protective film 78 and the gate insulating film 74 to expose the lower glass substrate 72.

Figure 9:
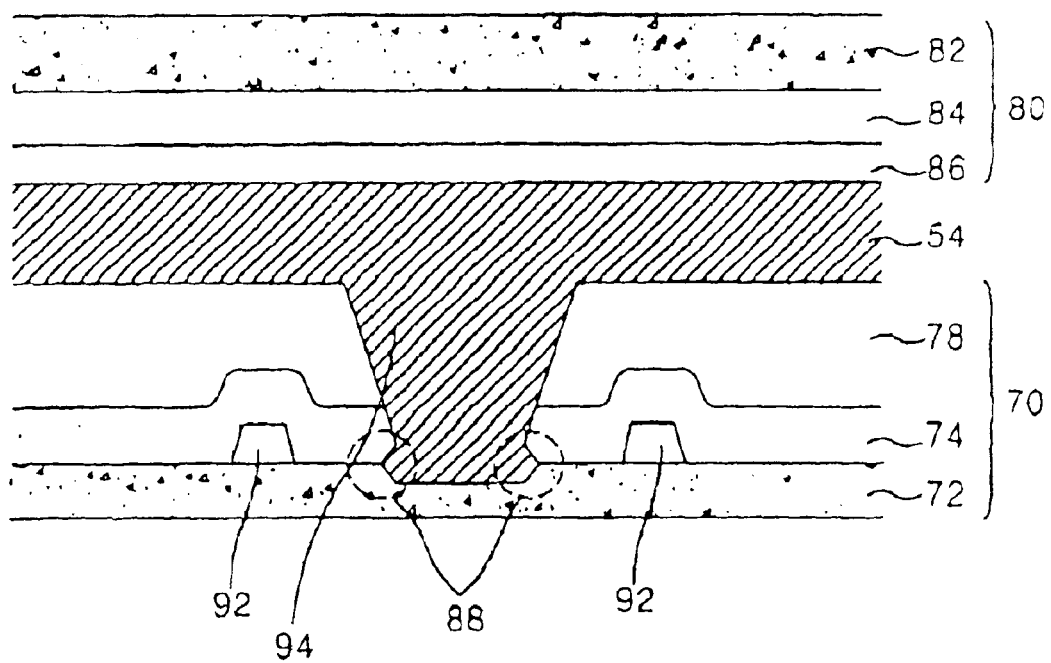
FIG. 9 is a sectional view showing the structure of the second conventional liquid crystal panel taken along the B—B' line in FIG. 8 after etching the organic protective film and the gate insulating film to form the channels in FIG. 8.

FIG. 9 shows a sectional view of the second conventional liquid crystal display panel taken along the B—B' line in FIG. 8. As shown in FIG. 9, the channels 94 expose the lower glass substrate 72 such that the sealant on the seal 54 can contact the lower glass substrate 72 during bonding of the upper plate 80 to the lower plate 70. The channels 94 are beneficially formed by dry etching of the organic protective film 78 and the gate insulating film 74 under the control of an etching point detective (EPD) window that is provided at an outer area of the panel. Since many sealants, such as epoxy resins, have stronger adhesion to the lower glass substrate 72 the bonding of the upper plate 80 to the lower plate 70 is improved.

However, channels 56 or 94 through the organic protective film 78 and the gate insulating film 74 that expose the lower glass substrate 72 leads to another problem. Since it is difficult to accurately control etching during dry etching, a portion of the lower glass substrate 72 is almost always, or always, overetched. Such overetching induces a substrate stress that can give rise to damage of the substrate 72. Furthermore, adhesive weakness to impact and a poor channel taper can be produced by undercuts 88, as shown in FIGS. 7 and 9, when etching the gate insulating film 74.

Accordingly, the principles of the present invention address problems in the prior art by providing channels between links that do not expose the lower glass substrate. Beneficially, patterned etch stops are used to form the channels, and thus prevent exposure of the lower glass substrate.

Figure 10:
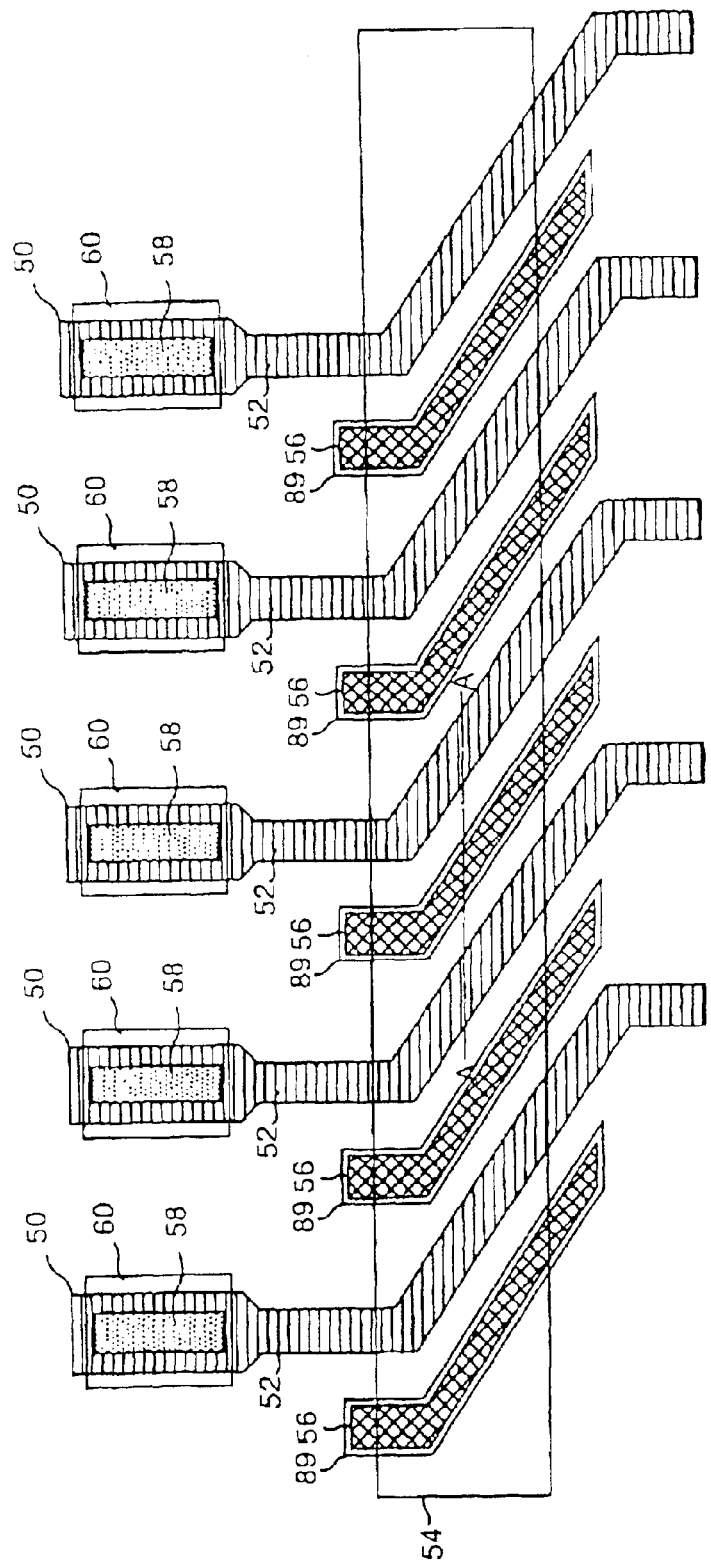
FIG. 10 is an enlarged plan view of data links crossing a seal in a liquid crystal display device according to a first embodiment of the present invention.
Figure 11:
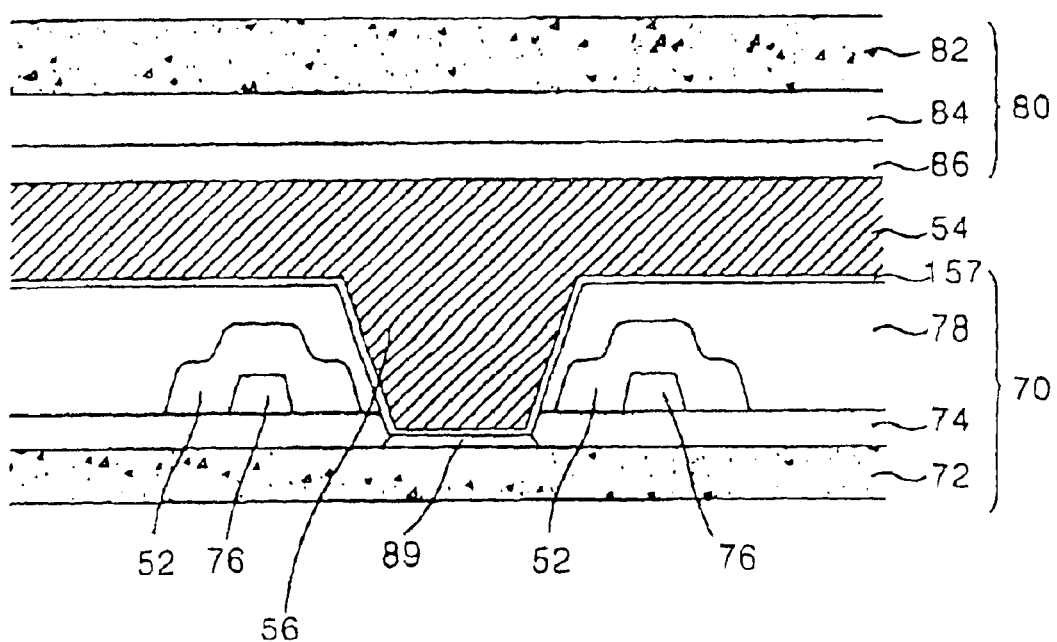
FIG. 11 is a sectional view of the first embodiment liquid crystal display panel taken along the A—A' line in FIG. 10.

FIG. 10 is a plan view of data links 52 crossing a seal 54 in a liquid crystal display device according to a first embodiment of the present invention, while FIG. 11 is a sectional view of the first embodiment liquid crystal display panel taken along the A—A' line in FIG. 10. Referring to FIG. 10 and FIG. 11 as required, the first embodiment liquid crystal display device includes metal patterns 89 that are formed between a lower glass substrate 72 and a gate insulating film 74 at locations between data links 52. The channels 56 are formed by removing the gate insulating film 74 and the organic protective film 78 over the metal patterns 89. The metal patterns 89 are beneficially formed at the same time as the gate electrodes, gate lines, gate pads and gate links, etc. using a photoresist mask after coating an electrode material on the lower glass substrate 72. The metal patterns 89 are beneficially formed with a larger width than the channels that are to be formed thereon. The channels 54 also beneficially extend beyond the area of the seal 54 as shown in FIG. 10. Then, the gate insulating film 74 is deposited thereon, and a semiconductor layer 76 and data links 52 are formed between the metal patterns 89. Thereafter, the organic protective film 78 is formed over the lower plate 70 by spin coating.

To define the channels 56 the organic protective film 78 and the gate insulating film 74 between the data links 52 are removed using a dry etching technique. An EPD window is formed at a location outside of the liquid crystal display panel. The EPD window permits easy visual detection of a reaction gas that occurs when dry etching reaches the window. This enable control of the etching process since the time required to see the reaction gas corresponds to the time required to etch through the organic protective layer and the gate insulating layer.

A pattern photoresist mask is formed on the organic protective film 78 to define wherein the channels 56 are to be formed. The organic protective film is then etched. A reaction gas at the EPD window signals when etching is complete. However, the metal patterns 89 formed on the lower glass substrate 72 act as etch stops for the channels 56, thereby preventing exposure of the lower glass substrate 72 during etching. Accordingly, an increase in substrate stress after dry etching, as well as undercutting of the gate insulating film 74, is prevented. Meanwhile, the photoresist mask defines the channels 56 such that they extended beyond the area of the seal 54. This prevents air bubbles from being formed in the channels 56 when the sealant-coated seal is applied. In the first embodiment of the present invention, a sealant 157 on the seal 54 contacts the metal patterns 89 by way of the channels 56. Since adhesion between the sealant 157 and the metal pattern 89 is better than that between the sealant 157 and the organic protective film 78, the bonding of the upper plate to the lower plate is improved.

Figure 12:
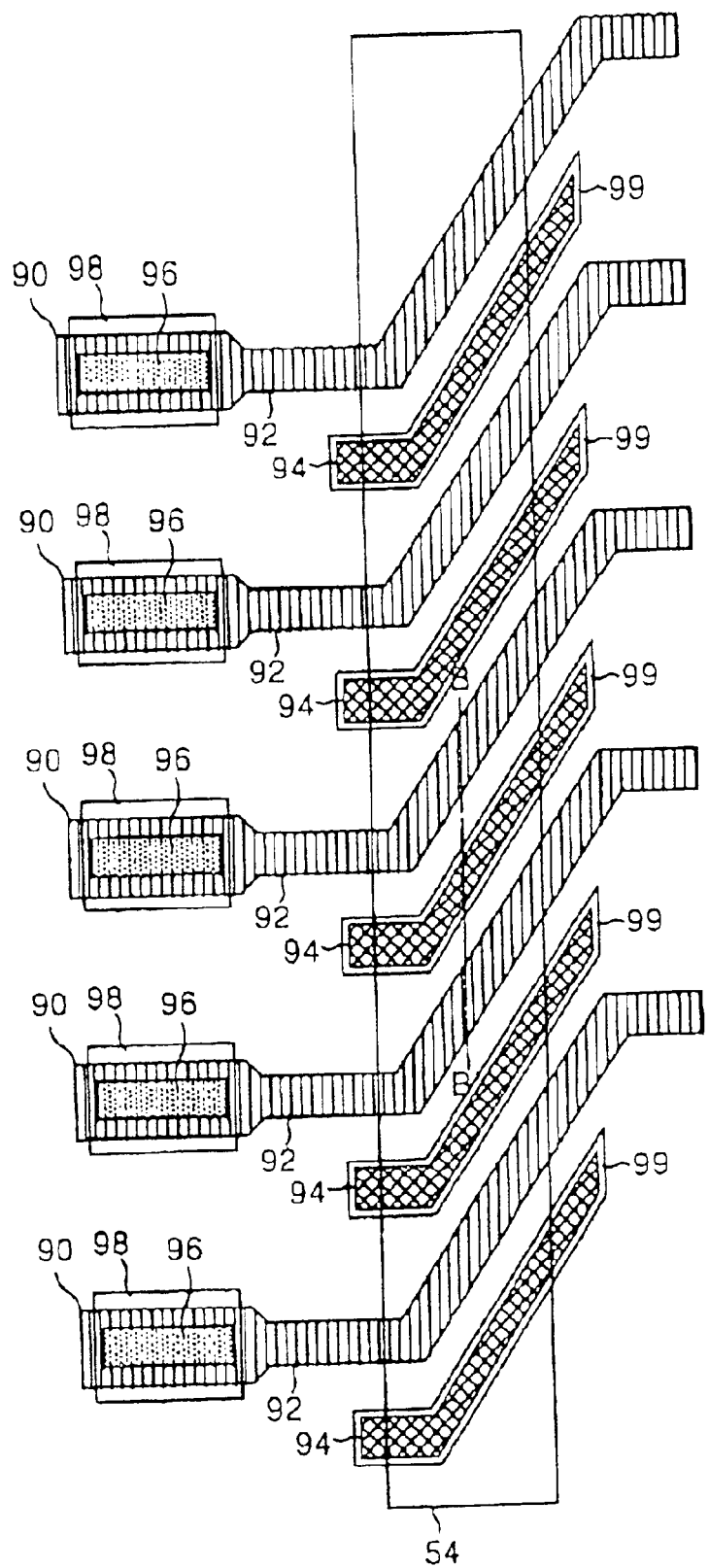
FIG. 12 is an enlarged plan view of gate links crossing a seal in a liquid crystal display device according to the first embodiment of the present invention.
Figure 13:
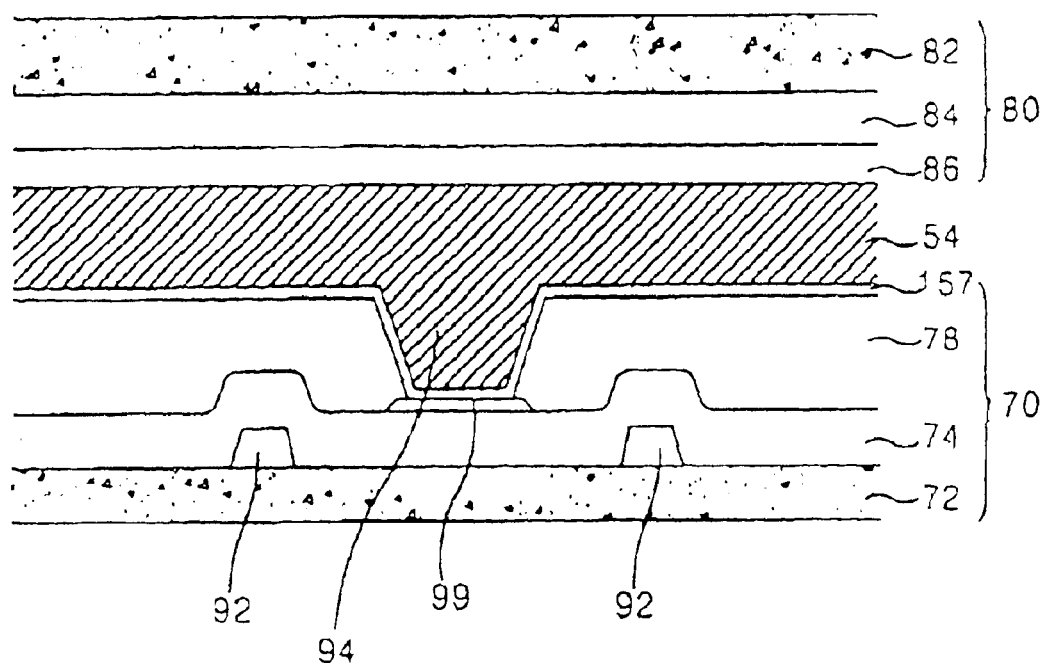
FIG. 13 is a sectional view of the first embodiment liquid crystal display panel taken along the B—B' line in FIG. 12.

FIG. 12 is a plan view of gate links crossing the seal 54 in the first embodiment liquid crystal display device. FIG. 13 is a sectional view of the first embodiment liquid crystal display panel taken along the B—B' line in FIG. 12. Referring to FIG. 12 and FIG. 13, the first embodiment liquid crystal display device includes metal patterns 99 formed between the gate insulating film 74 and the organic protective film 78 at locations between gate links 92. The channels 94 are formed by removing the organic protective film 78 over the metal patterns 99. A process of forming the gate links 92, the gate insulating film 74 and a semiconductor layer on the lower glass substrate 72 is similar to that in the prior art. Next, the metal patterns 99 are formed at the desired locations. The metal patterns 99 are beneficially formed at the same time as the data electrodes, data lines, data pads and data links by using a photoresist mask pattern after coating an electrode material on the gate insulating film 74. Patterning beneficially produces the metal patterns 99 such that they have a larger width than the channels 94 that are to be formed. The metal patterns also extend beneficially beyond the area of the seal 54, see FIG. 12. Then, the organic protective film 78 is formed on a lower plate 70 using spin coating.

To define the channels 94 between the gate links 92, the organic protective film 78 between the gate links 92 is removed using a dry etching technique. An EPD window is formed outside of the liquid crystal display panel in a similar manner as when channels 56 are formed between data links. A photoresist mask defines patterns where the organic protective film 78 is to be etched to form the channels 94. The channels are then etched. During etching, a reaction gas becomes visible at the EPD window when the etching exposes the EPD window. However, the metal patterns 99 on the gate insulating film 74 act as etch stops for the channels 94 such that only the organic protective film 78 is etched. Thus, etching of the gate insulating film 74 is prevented. Accordingly, an increase in stress of the lower glass substrate 72 caused by dry etching, as well as undercutting of the gate insulating film 74, is prevented. Meanwhile, the channels 94 extended beyond that seal area so as to prevent air bubbles from forming within the channels when a sealant-coated seal is located in place. In the first embodiment of the present invention, the sealant 157 on the seal 54 contacts the metal patterns 99 by way of the channels 94. Since adhesion between the sealant 157 and the metal patterns 99 is better than that between the sealant 157 and the organic protective film 78, adhesion between the sealant 157 and the lower plate 70 when bonding the upper plate to the lower plate is improved.

Figure 14:
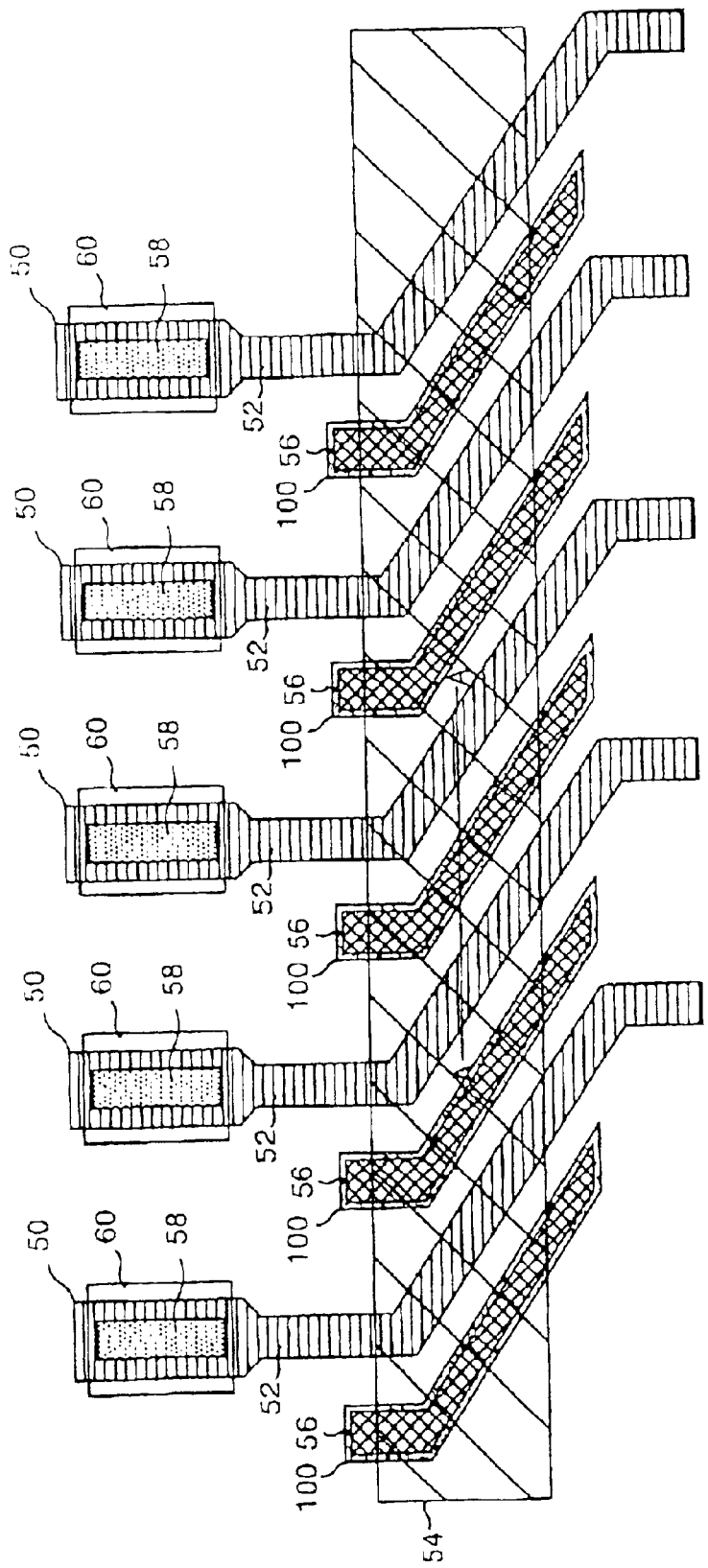
FIG. 14 is an enlarged plan view of data links crossing a seal in a liquid crystal display device according to a second embodiment of the present invention.
Figure 15:
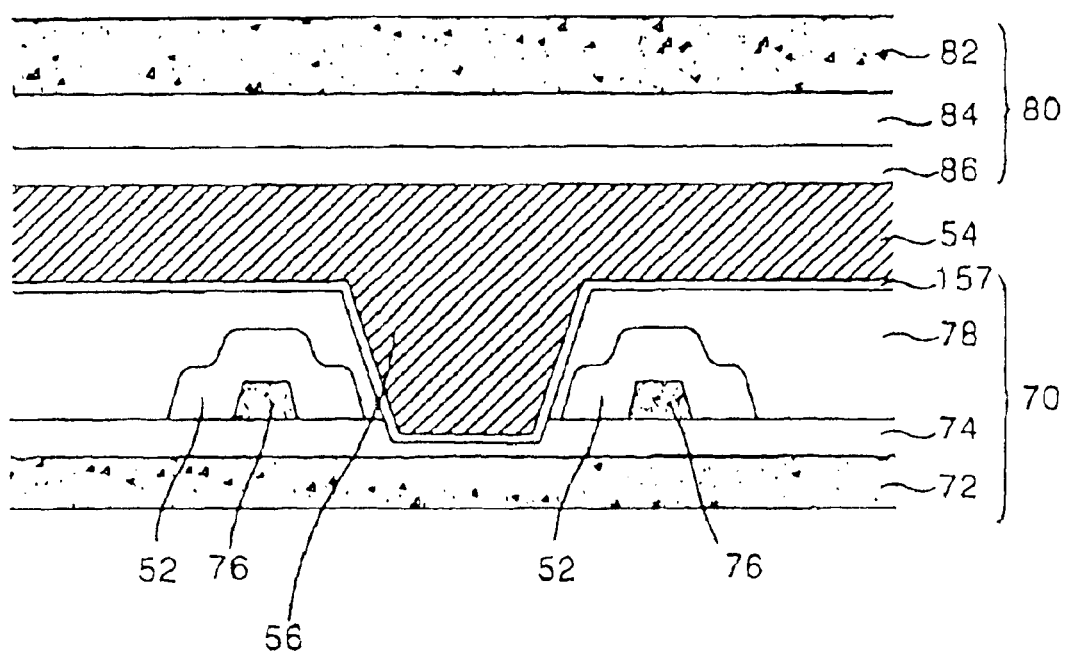
FIG. 15 is a sectional view of the second embodiment liquid crystal display panel taken along the A—A' line in FIG. 14.

FIG. 14 is a plan view of data links crossing a seal in a liquid crystal display device according to a second embodiment of the present invention. FIG. 15 is a sectional view of the second embodiment liquid crystal display panel taken along the A—A' line in FIG. 14. Referring to FIG. 14 and FIG. 15, the second embodiment liquid crystal display device includes semiconductor patterns 100 that are formed between a gate insulating film 74 and an organic protective film 78 at areas between data links 52. Channels 56 are formed by removing the organic protective film 78 over the semiconductor patterns 100. A process of forming the gate links and the gate insulating film 74 is similar to that in the prior art. The semiconductor patterns 100 are formed by placing a semiconductor layer 76, comprised of an amorphous silicon layer and an n+ amorphous silicon layer, on the gate insulating film 74 and then etching the semiconductor layer 76 using a photoresist mask pattern. Using an appropriate mask the semiconductor patterns 100 are created between where the data links 52 are to be located. The semiconductor patterns are formed with widths that are equal to or larger than the channels that are to be formed. The semiconductor patterns 100 are also formed so as to extended beyond the boundary of the seal 54, reference FIG. 14. Thereafter, an organic protective film 78 is formed on the lower plate 70 by spin coating.

The channels 56 are defined by removing the organic protective film 78 and the semiconductor pattern 100 between the data links 52 using a dry etching technique. That technique uses an EPD window formed outside of the liquid crystal display panel. A photoresist mask pattern is formed on the organic protective film 78 such that the channels are etched. During etching, a reaction gas at the EPD window signals that etching has proceeded sufficiently that the gate insulating film 74 would have been entirely removed. However, the semiconductor patterns 100 on the gate insulating film 74 act as etch stops that slow down the etching process. Generally, the etching rate is high through the organic protective film 78, lower through the inorganic gate insulating film 74, and lower still through the semiconductor patterns 100. Thus, when the reaction gas is detected in the EPD window a portion of the gate insulating film 74 remains between the bottoms of the channels 56 and the lower glass substrate 72. Since a semiconductor pattern is not formed at the EPD window, the organic protective film 78 is etched rapidly, and then the gate insulating film 74 is etched. When the reaction gas is detected an operator stops the etching. However, etching within the liquid crystal display panel is performed slowly because the semiconductor pattern 100 acts as an etch stop. Upon reaching the semiconductor patterns 100 the etching speed is suddenly reduced, allowing an operator to detect the reaction gas at the EPD window, thereby leaving some gate insulating film 74 at the lower portions of the channels 56. Thus, the lower glass substrate 72 at the lower portion of the gate insulating film 74 is not exposed. Accordingly, increased substrate stress caused by dry etching, as well as undercutting at the lower portion of the gate insulating film 74, can be prevented. Meanwhile, the channels 56 extended beyond the seal area to prevent air bubbles from being generated within the channels 56 when the sealant 157 comes into contact with the channels. In this second embodiment, a sealant-coated on the seal 54 contacts the remaining gate insulating film 74 at the bottom of the channels 56. Since adhesion between the sealant 157 and the gate insulating film 74, an inorganic material, is better than the adhesion between the sealant 157 and the organic protective film 78, bonding of the lower plate 70 to the upper plate 80 is improved.

Figure 16:
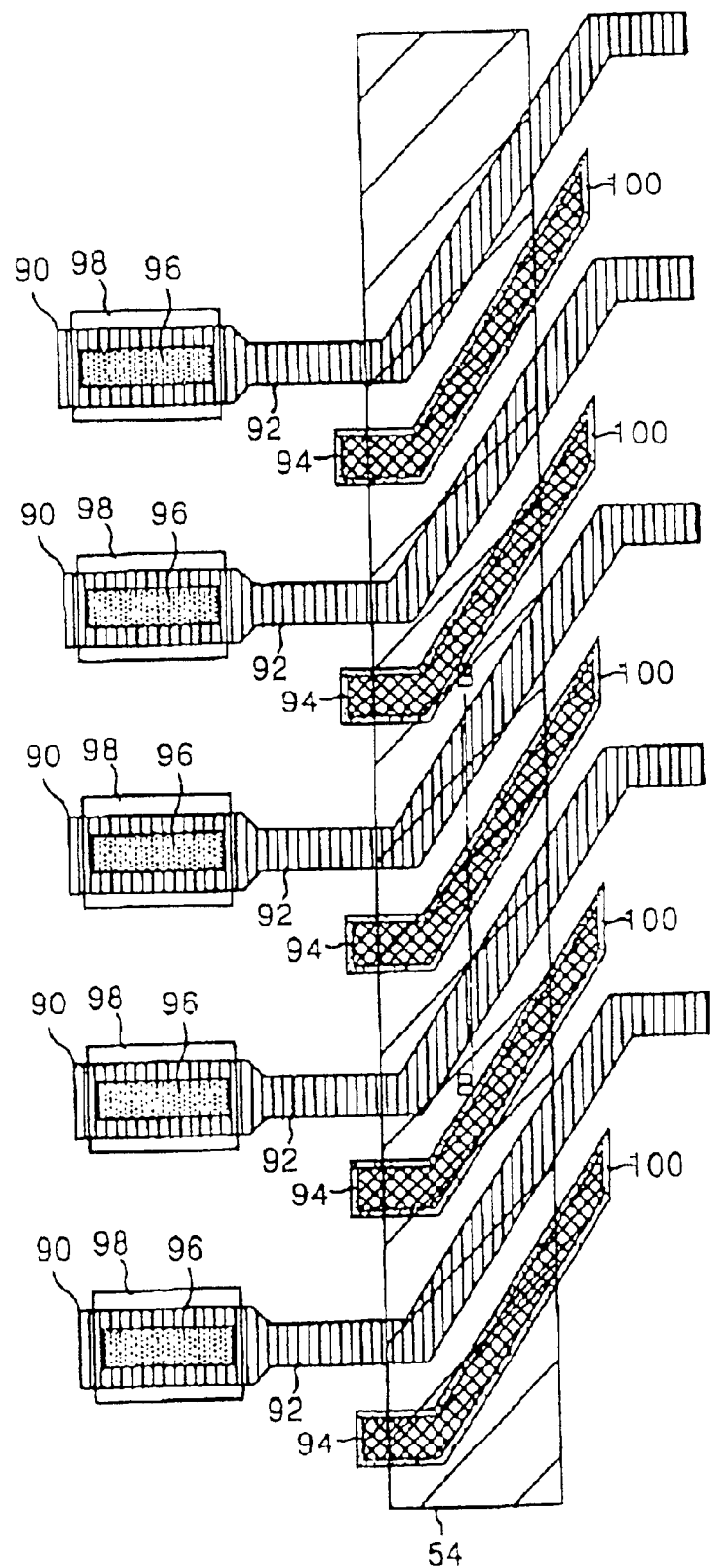
FIG. 16 is an enlarged plan view of gate links crossing a seal in a liquid crystal display device according to the second embodiment of the present invention.
Figure 17:
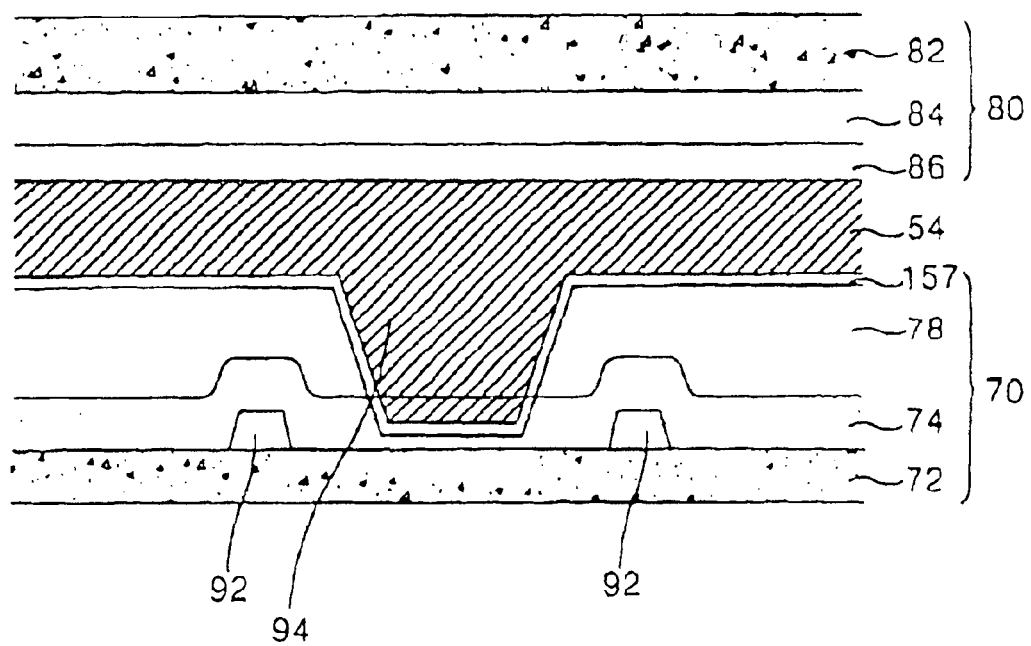
FIG. 17 is a sectional view of the second embodiment liquid crystal display panel taken along the B—B' line in FIG. 16.

FIG. 16 is a plan view of gate links crossing the seal in the second embodiment liquid crystal display device. FIG. 17 is a sectional view of the liquid crystal display panel taken along the B—B' line in FIG. 16. Referring to FIG. 16 and FIG. 17, the present liquid crystal display device includes semiconductor patterns 100 formed between a gate insulating film 74 and an organic protective film 78 at locations between the gate links 92. Channels 94 are then formed by removing the organic protective film 78 over the semiconductor patterns 100. The process of forming the gate links 92 and the gate insulating film 74 on the lower glass substrate 72 is similar to that in the prior art. The semiconductor patterns 100 between the gate links 92 are created by forming a semiconductor layer 76, which is comprised of an amorphous silicon layer and a n+ amorphous silicon layer, on the gate insulating film 74, forming a photoresist mask pattern and then etching. By patterning the photoresist mask appropriately, the semiconductor patterns 100 are formed with widths equal to or larger than the channel 94 that are to be formed. The semiconductor patterns 100 also are formed such that they extended beyond the area of the seal 54 as shown in FIG. 16.

To produce the channels 94 the organic protective film 78 and the semiconductor pattern 100 between the gate links 92 are removed by dry etching. To assist etching an EPD window is formed outside of the liquid crystal display panel. During etching, when a reaction gas at the EPD window is detected it is known that etching has passed through the gate insulating film 74 so as to expose the lower glass substrate 72. However, during etching, the semiconductor patterns 100 on the gate insulating film 74 act as etch stops at the locations of the channels 94. The etch stops slow the etching process such that, while the etch stops themselves are removed, portions of the gate insulating film 74 remain on the lower glass substrate. Accordingly, increased substrate stress caused by exposure of the lower glass substrate 72 during dry etching, as well as undercutting at the lower portion of the gate insulating film 74, can be prevented. Meanwhile, the channels 94 extend beyond the seal 54. This prevents air bubble being formed in the sealant 157 when the sealant coats the gate insulating film 74 at the bottom of the channels 94. As adhesion between the sealant 157 and the gate insulating film 74, which is an inorganic material, is better than the adhesion between the sealant 157 and the organic protective film 78, the bonding of the lower plate 70 to the upper plate 80 is improved.

As described above, a high aperture ratio LCD employing an organic protective film according to the present invention has a sealant that contacts something other then an organic protective film or a lower glass plate. In particular, the sealant 157 passes through channels to contact either metal patterns or an inorganic gate insulating film. Those channels are located between data links or between gate links where those links are crossed by a seal. The sealant 157 has better adhesion to the metal patterns and/or to the gate insulating film than to an organic protective film. The improved adhesion strengthens the bond between the upper and lower plates of the LCD. Beneficially, during fabrication of the LCD the metal patterns, or semiconductor patterns that are formed on the gate insulating film wherein the channels are to be located, act as etch stops during formation of the channels. Accordingly, exposure of the lower glass substrate, and an undercut problem, can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a lower plate having a lower substrate, a gate insulating film on said lower substrate, an organic protective film on said gate insulating film, a plurality of link electrodes, and a plurality of metal patterns, said lower plate further including a plurality of channels defined through said organic protective film, wherein each channel has a defining surface comprised of a metal pattern, and wherein said plurality of channels are at locations between two of said link electrodes;
   an upper plate; and
   a sealant coated seal between said lower plate and said upper plate for bonding said upper plate to said lower plate, wherein said sealant coated seal crosses said link electrodes, and wherein said sealant contacts said metal patterns.

2. A liquid crystal display device according to claim 1, wherein said lower substrate is comprised of glass.

3. A liquid crystal display device according to claim 1, wherein said link electrodes are on said lower substrate.

4. A liquid crystal display device according to claim 2, wherein said metal patterns are on said gate insulating film.

5. A liquid crystal display device according to claim 1, wherein said metal patterns are on said lower substrate.

6. A liquid crystal display device according to claim 5, wherein said channels are defined through said gate insulating film.

7. A liquid crystal display device according to claim 6, wherein said link electrodes are on said gate insulating film.

8. A liquid crystal display device according to claim 1, wherein said metal patterns are on said gate insulating film.

9. A liquid crystal display device according to claim 1, wherein said link electrodes are on said gate insulating film.

10. A liquid crystal display device according to claim 1, wherein said gate insulating film is comprised of an inorganic material.

11. A liquid crystal display device according to claim 1, wherein said channels extend beyond a contact width of said seal.

12. A liquid crystal display device according to claim 1, wherein said metal patterns are wider than said channels.

13. A liquid crystal display device, comprising:
    a lower plate having a lower substrate, a gate insulating film on said lower substrate, an organic protective film on said gate insulating film, and a plurality of link electrodes, said lower plate further including a plurality of channels defined through said organic protective film, wherein each channel has a bottom surface comprised of said gate insulating film, and wherein said plurality of channels are at locations between two of said link electrodes;
    an upper plate; and
    a sealant coated seal between said lower plate and said upper plate for bonding said upper plate to said lower plate, wherein said sealant coated seal crosses said link electrodes, and wherein said sealant contacts said gate insulating film.

14. A liquid crystal display device according to claim 13, wherein said lower substrate is comprised of glass.

15. A liquid crystal display device according to claim 13, wherein said link electrodes are on said lower substrate.

16. A liquid crystal display device according to claim 13, wherein said channels are defined partially through said gate insulating film.

17. A liquid crystal display device according to claim 13, wherein said link electrodes are on said gate insulating film.

18. A liquid crystal display device according to claim 13, wherein said gate insulating film is comprised of an inorganic material.

19. A liquid crystal display device according to claim 13, wherein said channels extend beyond a contact width of said seal.

* * * * *